(12) United States Patent
Pahrmann (10) Patent No.: US 11,733,261 B2
(45) Date of Patent: *Aug. 22, 2023

(54) ATTACHABLE WIND DETECTION DEVICE

(71) Applicant: John Pahrmann, Poulsbo, WA (US)

(72) Inventor: John Pahrmann, Poulsbo, WA (US)

(*) Notice: Subject to any disclaimer, the term of this patent is extended or adjusted under 35 U.S.C. 154(b) by 50 days.

This patent is subject to a terminal disclaimer.

(21) Appl. No.: 17/461,905

(22) Filed: Aug. 30, 2021

(65) Prior Publication Data

US 2021/0389343 A1  Dec. 16, 2021

Related U.S. Application Data (63) Continuation of application No. 17/376,648, filed on Jul. 15, 2021, now abandoned, which is a continuation of application No. 17/315,923, filed on May 10, 2021, now abandoned, which is a continuation of application No. 17/183,296, filed on Feb. 23, 2021, now abandoned, which is a continuation of application No. 16/723,739, filed on Dec. 20, 2019, now Pat. No. 10,928,415, which is a continuation-in-part of application No. 16/139,822, filed on Sep. 24, 2018, now Pat. No. 10,514,388, which is a continuation-in-part of application No. 16/045,664, filed on Jul. 25, 2018, now abandoned.

(60) Provisional application No. 62/898,982, filed on Sep. 11, 2019, provisional application No. 62/536,952, filed on Jul. 25, 2017.

(51) Int. Cl.
*G01P 13/02* (2006.01)
*F41G 3/08* (2006.01)
*G01P 13/00* (2006.01)
*A61J 9/04* (2006.01)
*A01M 31/00* (2006.01)
*B05B 11/06* (2006.01)
*F41B 5/14* (2006.01)

(52) U.S. Cl.
CPC ............... *G01P 13/02* (2013.01); *F41G 3/08* (2013.01); *G01P 13/0006* (2013.01); *A01M 31/00* (2013.01); *A01M 31/008* (2013.01); *A61J 9/04* (2013.01); *B05B 11/06* (2013.01); *B05B 11/062* (2013.01); *F41B 5/148* (2013.01); *G01P 13/0093* (2013.01)

(58) Field of Classification Search
CPC .. G01P 13/02; G01P 13/0006; G01P 13/0093; F41G 3/08; A01M 31/00; A01M 31/008; A61J 9/04; B05B 11/06; B05B 11/062; F41B 5/148
See application file for complete search history.

(56) References Cited

U.S. PATENT DOCUMENTS

| 4,341,030 A | * | 7/1982 | Little | A01M 31/00 |
| | | | | 42/105 |
| 5,398,848 A | * | 3/1995 | Padamsee | A45F 3/20 |
| | | | | 222/105 |

(Continued)

*Primary Examiner* — John Fitzgerald
*Assistant Examiner* — Tania Courson
(74) *Attorney, Agent, or Firm* — Galvin Patent Law LLC; Brian R. Galvin (57) ABSTRACT

A wind detection device with a flexible enclosure, and opening, and a dispensing tube, filled with powder or liquid and designed to be attached to hunting equipment, headgear, or clothing, wherein pressing on the outside of the device causes a puff of powder or vapor to be dispensed into the air, allowing the user to determine wind direction.

2 Claims, 7 Drawing Sheets

(56) References Cited

U.S. PATENT DOCUMENTS

| | | | | |
|---|---|---|---|---|
| 5,520,164 | A * | 5/1996 | Huddleston | F41B 5/14 124/89 |
| D386,256 | S * | 11/1997 | Turpin | D22/125 |
| 5,906,298 | A * | 5/1999 | Ward | A61L 9/127 239/36 |
| 5,971,208 | A * | 10/1999 | Kennedy | A01K 15/02 222/54 |
| 6,742,723 | B2 * | 6/2004 | Felegy | A01M 31/008 239/289 |
| 6,810,614 | B2 * | 11/2004 | Phillips | F41C 27/00 42/75.01 |
| 6,848,302 | B1 * | 2/2005 | Williamson | A63B 57/00 73/170.04 |
| 7,503,321 | B2 * | 3/2009 | Afshari | F41G 1/467 124/87 |
| 7,690,540 | B1 * | 4/2010 | Owens | A01M 31/008 222/642 |
| 7,721,597 | B2 * | 5/2010 | Onishi | A63B 57/00 73/170.01 |
| 8,510,984 | B2 * | 8/2013 | Burgeson | A01M 31/008 222/54 |
| 8,905,667 | B1 * | 12/2014 | Burks | A01M 31/00 224/148.1 |
| 9,179,730 | B2 * | 11/2015 | Waters | A43B 3/0031 |
| 10,114,036 | B2 * | 10/2018 | Ferrara, Jr. | G01P 13/0093 |
| 10,514,388 | B2 * | 12/2019 | Pahrmann | G01P 13/02 |
| 10,928,415 | B2 * | 2/2021 | Pahrmann | G01P 13/0006 |
| 2012/0223102 | A1 * | 9/2012 | Ambrose, Jr. | A01M 31/008 222/145.5 |
| 2019/0033338 | A1 * | 1/2019 | Pahrmann | G01P 13/0093 |
| 2021/0181233 | A1 * | 6/2021 | Pahrmann | G01P 13/02 |
| 2021/0263064 | A1 * | 8/2021 | Pahrmann | G01P 13/0006 |
| 2021/0341509 | A1 * | 11/2021 | Pahrmann | G01P 13/0006 |
| 2021/0389343 | A1 * | 12/2021 | Pahrmann | F41G 3/08 |

* cited by examiner

Fig. 5A (side view)

Fig. 5B (top view)

Fig. 5C (front view)

ATTACHABLE WIND DETECTION DEVICE

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/376,648
Ser. No. 17/315,923
Ser. No. 17/183,296
Ser. No. 16/723,739
62/898,982
Ser. No. 16/139,822
U.S. Pat. No. 10,514,388
Ser. No. 16/045,664
62/536,952

BACKGROUND OF THE INVENTION

Field of the Art

The disclosure relates to the field of wind detection in hunting, and more particularly to a hands-free, attachable wind detection device for bow hunting.

Discussion of the State of the Art

In the field of hunting, hunters often spend hours or days tracking their prey forgoing modern luxuries such as running toilets, showers, clean shaves, or fresh laundry. This generally leads to a very dirty and smelly hunter tracking an animal such as deer, which is a very scent-sensitive creature. Wind direction can make or break a hunt; if a smelly hunter is positioned upwind of his prey, his scent can tip off his prey and run away thus ending a long hunting trip with no reward.

Hunters then have a need for wind speed and direction detection without removing their hands from their hunting equipment (e.g., bow, rifle). Common wind detectors are a simple squeeze bottle with talcum powder that can be kept in the hunters' pockets. This remedy requires the hunter to remove his hand from the hunting equipment, reach into the pocket, grab the bottle, pull it out of the pocket, squeeze it, and then place the bottle back into the pocket before he places his hand back on his hunting equipment. Any one of these movements can spook the prey and end the hunt with no reward.

What is needed, is a means to provide a wind detection device that attaches directly to a piece of hunting equipment, headgear, or clothing and remains attached, thus eliminating the need for a hunter to take his hands off the hunting equipment while checking for wind direction, as well as eliminating any unnecessary movements that could scare off the prey.

SUMMARY OF THE INVENTION

Accordingly, the inventor has conceived and reduced to practice, in a preferred embodiment of the invention, a device for an attachable wind detector that affixes directly to a hunting equipment removing need for unnecessary hand movements.

According to a preferred embodiment, a wind detection device is disclosed, comprising: an enclosure comprising an interior cavity, a flexible wall, and a mounting structure; an opening in the enclosure configured to allow insertion and retention of a dispensing tube; a dispensing tube inserted into and retained in the opening, the dispensing tube having a first and a second end, with the first end extending through the opening into the interior cavity, and with a longitudinal hole extending the length of the dispensing tube from the first end to the second end; and a mounting receiver configured to be attached to an object, and configured to receive and hold the mounting structure on the enclosure; wherein, when a particulate substance is contained within the interior cavity, pressure on the exterior of the enclosure causes air in the interior cavity to be compressed, forcing a mixture of air and particulate matter from the interior cavity into the first end of the dispensing tube and out of the second end of the dispensing tube.

According to an aspect of an embodiment, the object to which the mounting receiver is attached is a piece of hunting equipment.

According to an aspect of an embodiment, the piece of hunting equipment is a bow.

According to an aspect of an embodiment, the piece of hunting equipment is a rifle.

According to an aspect of an embodiment, the object to which the mounting receiver is attached is a piece of headgear or a piece of clothing.

According to an aspect of an embodiment, the mounting receiver is attached to the object using an adhesive.

According to an aspect of an embodiment, the object is made at least partly of a ferrous metal, and the mounting receiver is attached to the ferrous metal portion of the object using a magnet.

According to an aspect of an embodiment, the object is a piece of headgear or clothing, and the mounting receiver is attached to the object using two magnets, one magnet of a first polarity on the mounting receiver on the outside of the object and one magnet of the opposite polarity on the inside of the object.

According to an aspect of an embodiment, the mounting structure comprises a hook or post, and the mounting receiver comprises a hole into which the hook or post may be placed.

According to an aspect of an embodiment, the mounting structure comprises a clip, and the mounting receiver comprises a slot into which, or through which, the clip may be inserted.

According to an aspect of an embodiment, the mounting structure comprises one component of a hook and loop fabric, and the mounting receiver comprises the other component of a hook and loop fabric.

According to an aspect of an embodiment, the mounting structure comprises a magnet of a first polarity, and the mounting receiver comprises a magnet of the opposite polarity.

According to an aspect of an embodiment, the mounting structure comprises either the male or female portion of a threaded screw attachment, and the mounting receiver comprises the opposite portion of a threaded screw attachment.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the draw

DETAILED DESCRIPTION

Detailed Description of Exemplary Embodiments

Figure 1:
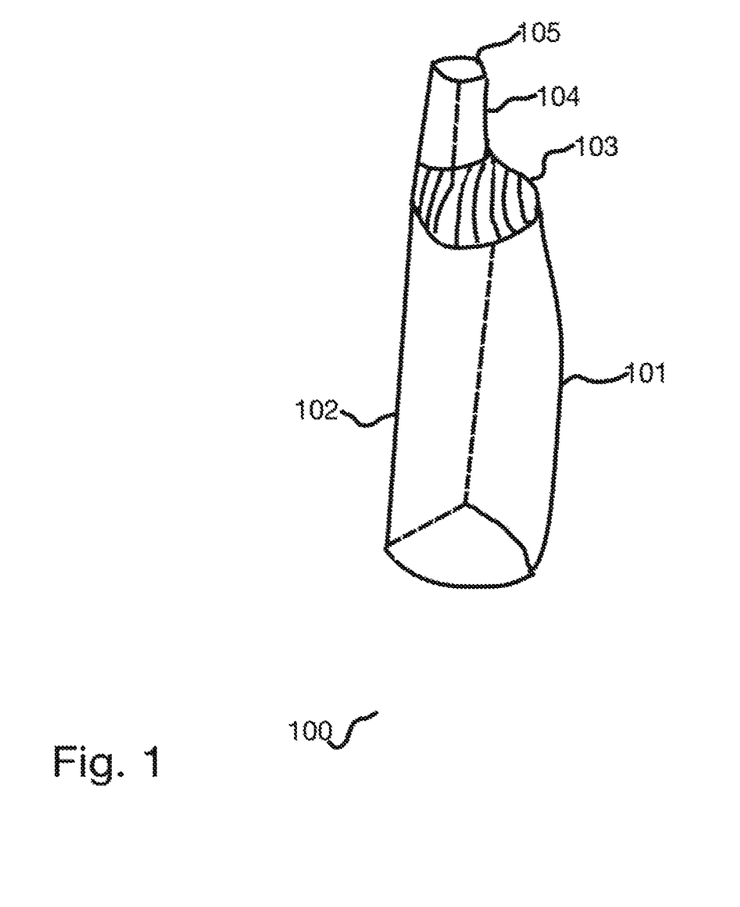
- FIG. 1 is an illustration of an exemplary wind detection device according to a preferred embodiment of the invention, illustrating device design for attachment.

FIG. 1 is an illustration of an exemplary wind detection device according to a preferred embodiment of the invention, illustrating device design for attachment 100.

According to the embodiment, a wind detection device 100 may comprise a generally bisected cylindrical-type shape 101 (generally, a bisected cylindrical-type shape to be assembled as illustrated; however, it should be appreciated that other final shapes may be used according to a desired arrangement or use case, such as an elliptical-type shape, or an oval-type shape, or a circular-type shape, or other arrangement) with flat face 102 along the bisection for attachment to surfaces such as a hunting bow (however, it should be appreciated that device may attach to other surfaces such as longbows, recurve bows, compound bows, crossbows, guns such as rifles for rifle hunting, or string spools for kite flying, hat or visor or other devices according to a preferred arrangement or use case). Wind detection device 100 may have opaque, semi-translucent, or translucent walls 101, 102 formed of an impermeable material such as plastic (however, it should be appreciated that other materials may be used to form device walls such as (PP) Polyhigh-density polyethylene (HDPE), low-density polyethylene (LDPE), post-consumer resin (PCR), or plastic-like substances such as silicone, or polyesters such as polyethylene terephthalate (PET), or other materials according to a preferred arrangement or use case); formed where one end of device 100 narrows down to form an opening (mouth) where a lid 103 may attach to and subsequently seal device 100; and where lid 103 narrows down further to another cylindrical-type shape or conical-type shape 104 with another, smaller opening (mouth) 105 for detector contents of device to exit through when device 100 is in use. It should be noted the entire enclosure does not need to be made of the same material. In some embodiments, the enclosure will be made of a combination of materials. In some embodiments, the enclosure will be made of a combination of rigid and flexible materials. For example, in some embodiments, the enclosure may be box-shaped with one flexible wall. In other embodiments, the enclosure may have flexible sidewalls like an accordion or a bellows.

Figure 2:
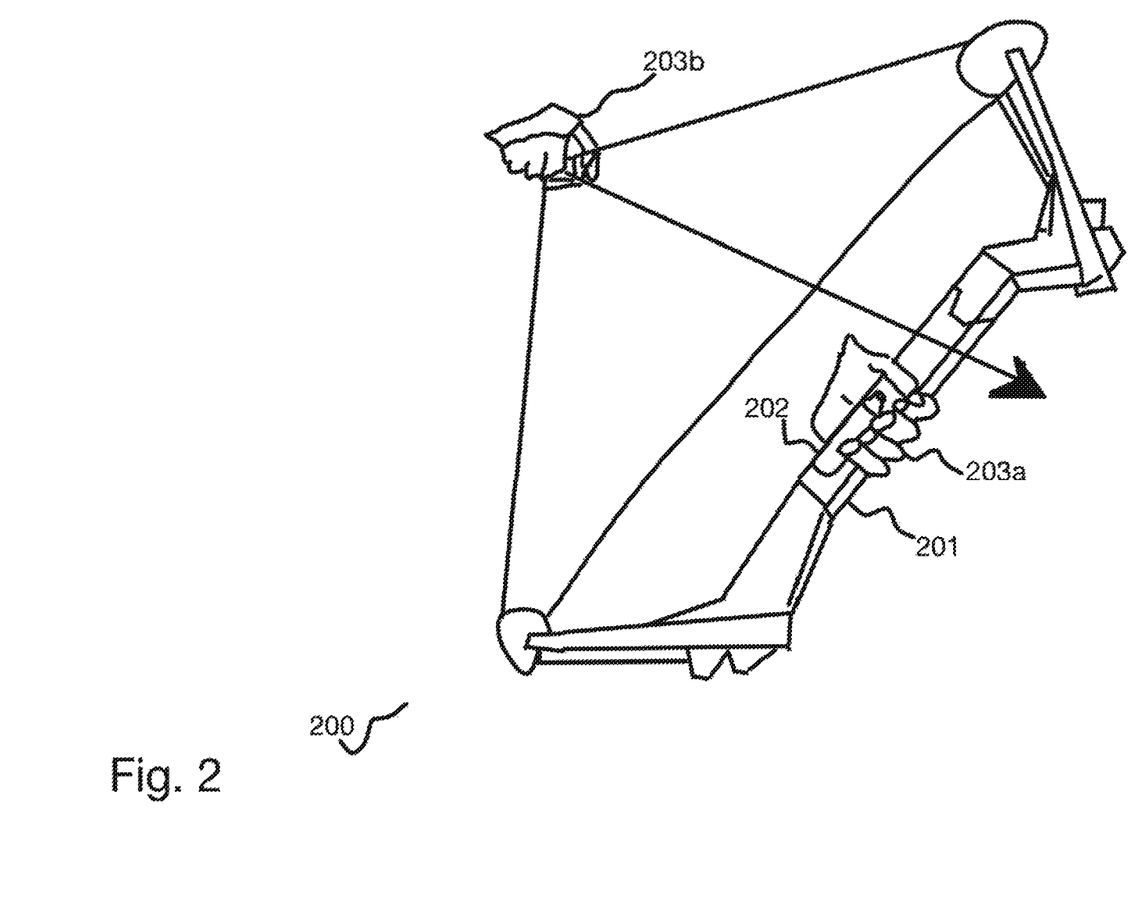
FIG. 2 is an illustration of an exemplary wind detection device according to a preferred embodiment of the invention, illustrating a hunting bow with wind detection device attached.

FIG. 2 is an illustration of an exemplary wind detection device according to a preferred embodiment of the invention, illustrating a hunting bow 200 with wind detection device attached. According to the embodiment, wind detection device 202 attaches directly to hunting bow 201 via an adhesive-type substance such as heavy-duty, double-sided tape (however, it should be appreciated that other adhesive substances may be used such glues, resins, strip adhesives, or other adhesives according to a preferred arrangement or use case). Adhesive is placed between desired surface location of hunting bow 201 and bisected flat surface 102 of device 202. Device 202 may be placed anywhere on hunting bow 201 according to a desired arrangement or use case of the embodiment; if device 202 is attached to hunting bow 201 near grip where hand 203a holds hunting bow 201, then hand 203a may tap or press device 202 to release detector contents such as talcum powder (generally talcum powder is used for wind detection; however, it should be appreciated that other detector contents may be used inside device such as construction chalk, baking powder, corn starch, milkweed seed pods, or micro-balloons, or other contents according to a preferred arrangement or use case), and thereby preventing the need for hand 203a to be removed from hunting bow 201 to retrieve device 202 from within hunter's pockets or bag. Attaching device 202 to hunting bow 201 also prevents need to remove hand 203b from string of hunting bow 201 which also prevents the need to reset any parts of hunting bow 201 (such as resetting an arrow).

Figure 3:
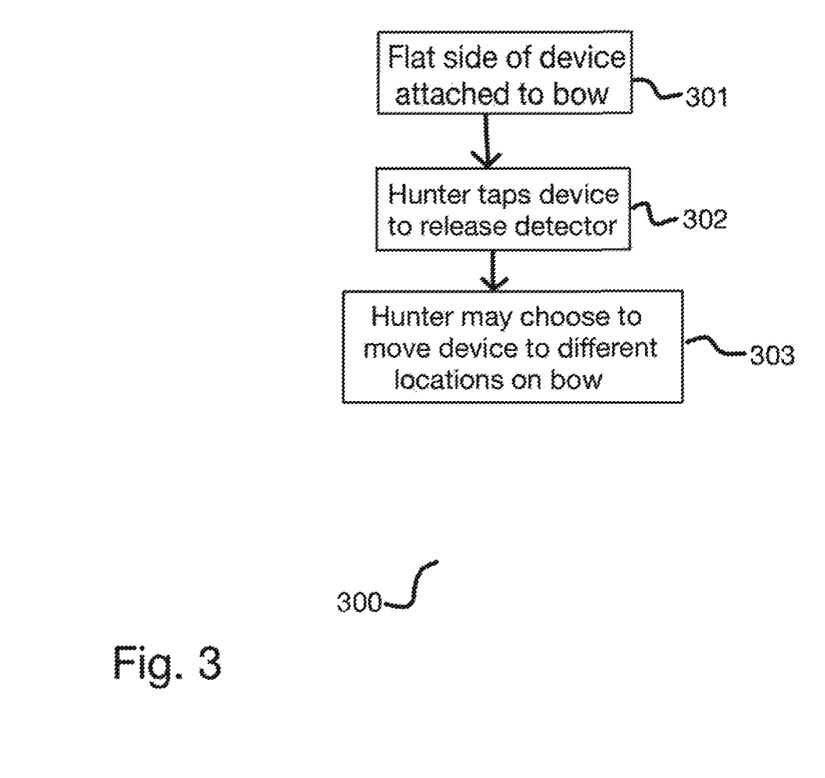
FIG. 3 is an illustration of an exemplary method diagram according to a preferred embodiment of the invention, illustrating use of wind detection device.

FIG. 3 is an illustration of an exemplary method diagram according to a preferred embodiment of the invention, illustrating use 300 of hands-free attachable wind detection device. In a first step, hands-free wind detection device is attached to hunting bow surface 301 along bisected flat side of device with a strong adhesive. In a next step, hunter taps or presses device to release detector contents 302 such as talcum powder into the air for wind detection. Detector contents leave device through a small opening at the top of device and float in direction of wind as well as float with the wind speed. In an optional step, hunter may choose to reattach device 303 to a different position along bow.

Figure 4:
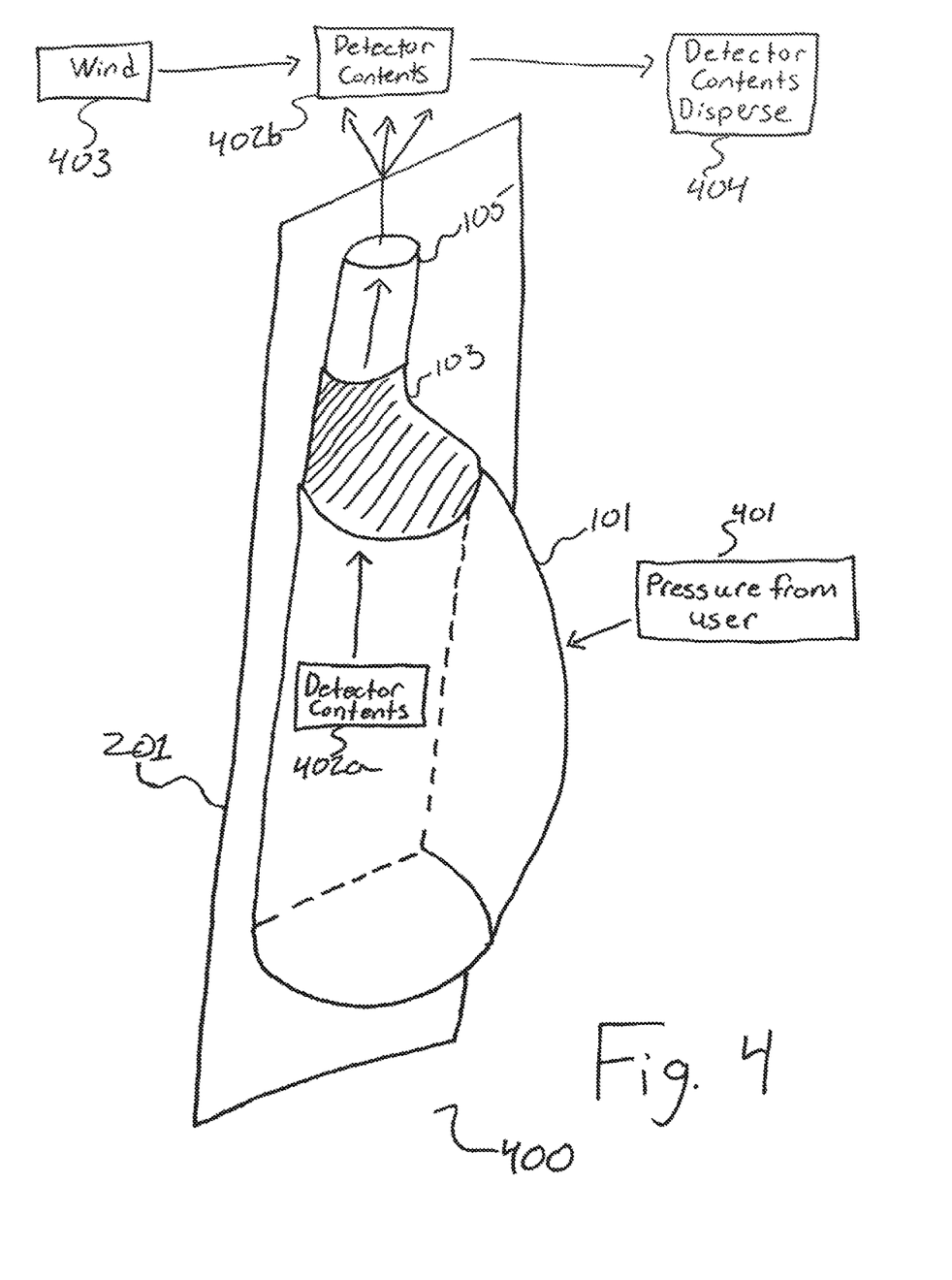
FIG. 4 is an illustration of an exemplary wind detection device according to a preferred embodiment of the invention, illustrating use of wind detection device attached to surface of a hunting bow.
Figure 5A:
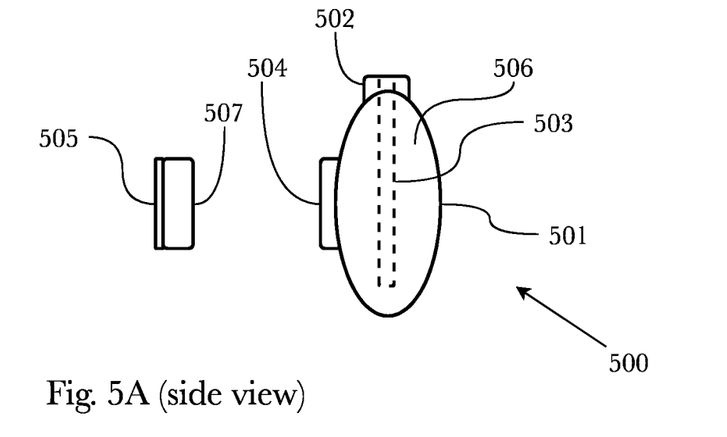
FIGS. 5A-5C are illustrations of a preferred embodiment having a circular frontal cross-section, an ovular side cross-section, and showing a mounting structure and mounting receiver.
Figure 5B:
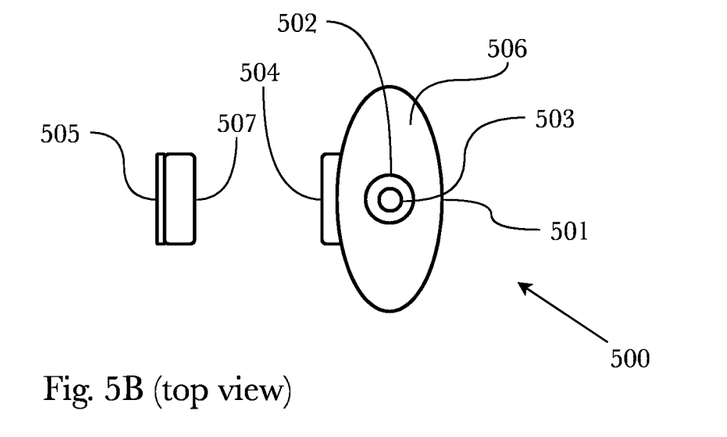
Figure 5C:
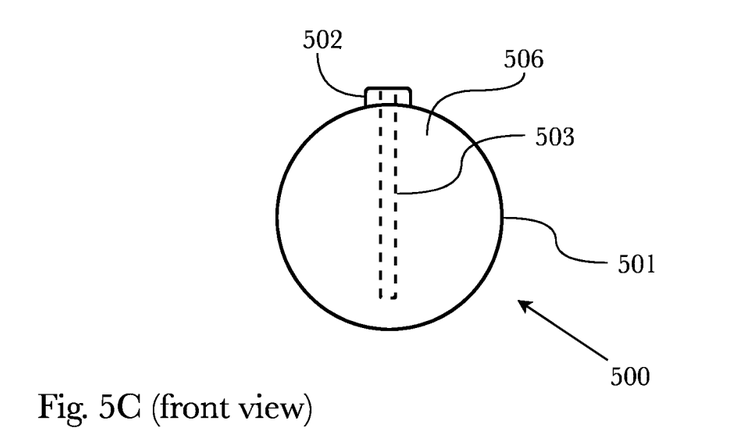
Figure 6:
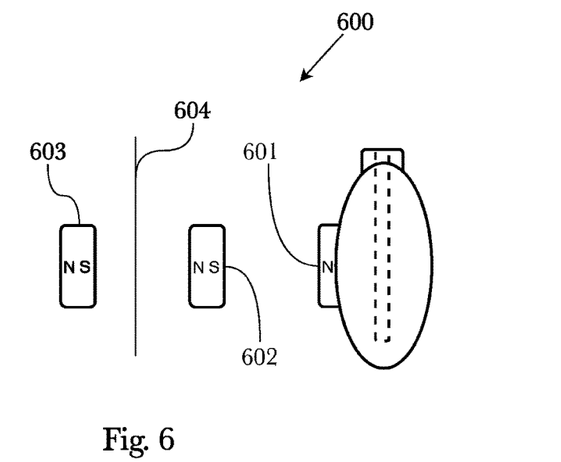
FIG. 6 shows an aspect in which the device is attached through a thin object such as a hat or piece of clothing using magnets.
Figure 7:
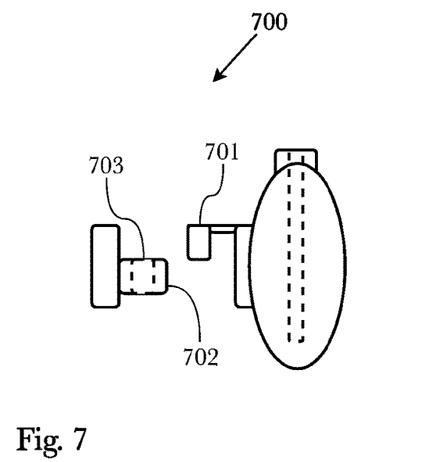
FIG. 7 shows an aspect in which the device is attached by a hook, post, or pin placed into a hole.
Figure 8:
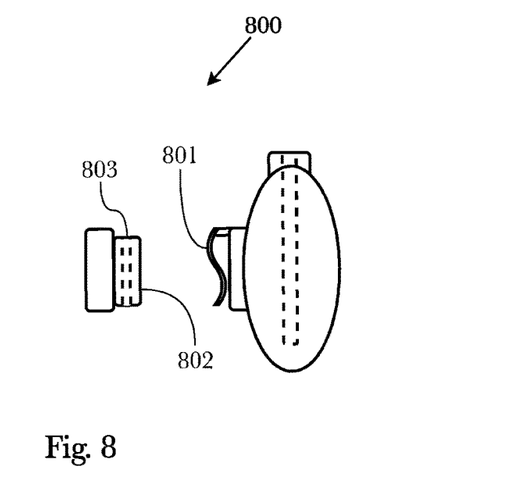
FIG. 8 shows an aspect in which the device is attached by a clip placed into a slot.
Figure 9:
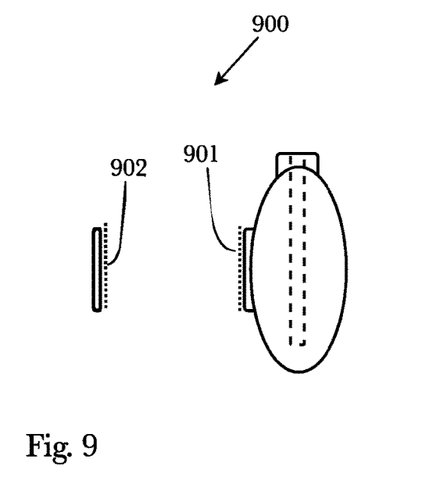
FIG. 9 shows an aspect in which the device is attached by a hook and loop fastener (commonly known as velcro, and often associated with the brand name Velcro™).
Figure 10:
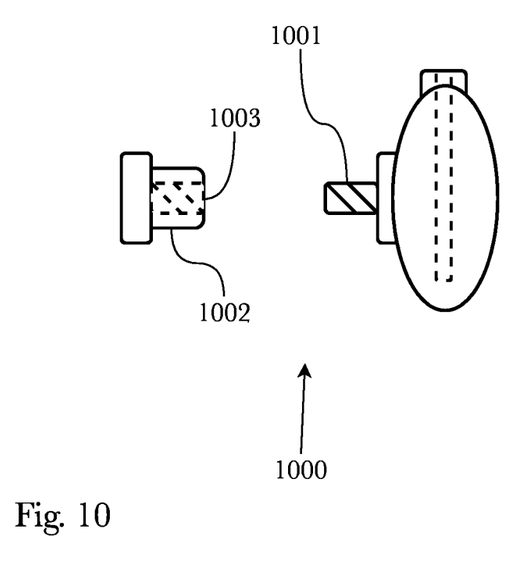
FIG. 10 shows an aspect in which the device is attached by a threaded screw mechanism.

FIG. 4 is an illustration of an exemplary wind detection device according to a preferred embodiment of the invention, illustrating use 400 of wind detection device attached to surface of a hunting bow. Device 101 attaches to surface of hunting bow 201 via an adhesive placed between bisected flat surface of device 101 and surface of hunting bow 201. Detector contents 402a such as talcum powder are contained within device 101. User of device 101 such as a hunter, may apply pressure 401 to device 101 walls that are not attached to surface of hunting bow 201. The pressure 401 from user pushes device 101 walls in towards the bisected wall, thereby squeezing detector contents 402a within device 101. Detector contents 402a move from the applied pressure 401 of device 101 walls and move upwards through lid 103 and continue upward through mouth 105 of device 101. Once outside of device 101, detector contents 402b may then be 
subjected to wind 403; wind 403 pushes detector contents 402*b* along wind 403 path and thereby disperses detector contents **404 a longitudinal hole extending the length of the dispensing tube from the first end to the second end; and a mounting receiver comprising an adhesive surface and a female threaded screw, wherein the mounting receiver is configured to be attached to an object by means of the adhesive surface, and configured to receive and hold the mounting structure of the enclosure by means of the female threaded screw;

wherein, when a particulate substance is contained within the interior cavity, pressure on the exterior of the enclosure causes air in the interior cavity to be compressed, forcing a mixture of air and particulate matter from the interior cavity into the first end of the dispensing tube and out of the second end of the dispensing tube.

2. A wind detection device, comprising:

an enclosure comprising an interior cavity, a flexible wall, and a mounting structure, the mounting structure comprising a female threaded screw;

a dispensing tube inserted into the enclosure, the dispensing tube having a first and a second end and comprising a longitudinal hole extending the length of the dispensing tube from the first end to the second end; and a mounting receiver comprising an adhesive surface and a male threaded screw, wherein the mounting receiver is configured to be attached to an object by means of the adhesive surface, and configured to receive and hold the mounting structure of the enclosure by means of the male threaded screw;

wherein, when a particulate substance is contained within the interior cavity, pressure on the exterior of the enclosure causes air in the interior cavity to be compressed, forcing a mixture of air and particulate matter from the interior cavity into the first end of the dispensing tube and out of the second end of the dispensing tube.

* * * * *